US006250676B1

(12) United States Patent
Werstat et al.

(10) Patent No.: US 6,250,676 B1
(45) Date of Patent: Jun. 26, 2001

(54) GAS BAG FOR AN AIRBAG MODULE, METHOD AND DEVICE FOR FOLDING A GAS BAG

(75) Inventors: Wolfram Werstat, Bernau; Andreas Sturm, Berlin; Dieter Markfort, Berlin; Axel Malczyk, Berlin; Heinz-Dieter Adomeit, Berlin, all of (DE)

(73) Assignee: Petri AG, Aschaffenburg (DE)

( * ) Notice: Subject to any disclaimer, the term of this patent is extended or adjusted under 35 U.S.C. 154(b) by 0 days.

(21) Appl. No.: 09/297,756

(22) PCT Filed: Nov. 10, 1997

(86) PCT No.: PCT/DE97/02665

§ 371 Date: May 5, 1999

§ 102(e) Date: May 5, 1999

(87) PCT Pub. No.: WO98/22311

PCT Pub. Date: May 28, 1998

(30) Foreign Application Priority Data

Nov. 15, 1996  (DE) .............................................. 196 48 654

(51) Int. Cl.⁷ .................................................. B60R 21/16
(52) U.S. Cl. .......................................................... 280/743.1
(58) Field of Search ............................. 280/743.1, 728.1, 280/730.1, 731

(56) References Cited

U.S. PATENT DOCUMENTS

| 4,178,017 | * | 12/1979 | Ishi et al. | 280/740 |
|---|---|---|---|---|
| 4,235,453 | * | 11/1980 | Lawson et al. | 280/743 |
| 5,178,407 | * | 1/1993 | Kelly | 280/728 |
| 5,275,435 | * | 1/1994 | Fisher | 280/743 R |
| 5,300,011 |   | 4/1994 | Budde et al. | 493/405 |
| 5,360,387 |   | 11/1994 | Baker | 493/405 |
| 5,391,137 |   | 2/1995 | DePoy et al. | 493/405 |
| 5,456,651 |   | 10/1995 | Baker et al. | 493/405 |
| 5,496,061 |   | 3/1996 | Brown | 280/730.2 |
| 5,531,476 |   | 7/1996 | Kerner | 280/743.1 |
| 5,613,707 |   | 3/1997 | Berti | 280/743.1 |

FOREIGN PATENT DOCUMENTS

| 42 27 559 A1 | 2/1994 | (DE) . |
|---|---|---|
| 44 40 844 A1 | 5/1996 | (DE) . |
| 195 05 507 A1 | 8/1996 | (DE) . |
| 195 16 494 C1 | 10/1996 | (DE) . |
| 296 09 703 U1 | 11/1996 | (DE) . |
| 0 443 485 A1 | 8/1991 | (EP) . |
| 0 523 704 A1 | 1/1993 | (EP) . |
| 0 686 531 A1 | 12/1995 | (EP) . |
| 0 705 738 A1 | 4/1996 | (EP) . |
| 0 734 911 A1 | 10/1996 | (EP) . |
| 2 279 046 | 12/1994 | (GB) . |

OTHER PUBLICATIONS

Disclosed Anonymously, "Side Impact Air Bag and method for Folding", pp. 329/330, Research Disclosure, May 1996.

* cited by examiner

*Primary Examiner*—Paul N. Dickson
*Assistant Examiner*—Tony Winner
(74) *Attorney, Agent, or Firm*—Foley & Lardner

(57) ABSTRACT

The invention relates to a gas bag for an airbag module wherein the gas bag is folded in the rest position. According to the invention a telescopic folding is provided, as well as a method and a device for folding a gas bag, wherein chaotically folded sections extend around telescopic folds. The folding is conducted so that the gas bag is placed telescopically in folds into the inside of the gas bag stepwise, at least from one side, and is then compressed to form the chaotic folds.

13 Claims, 3 Drawing Sheets

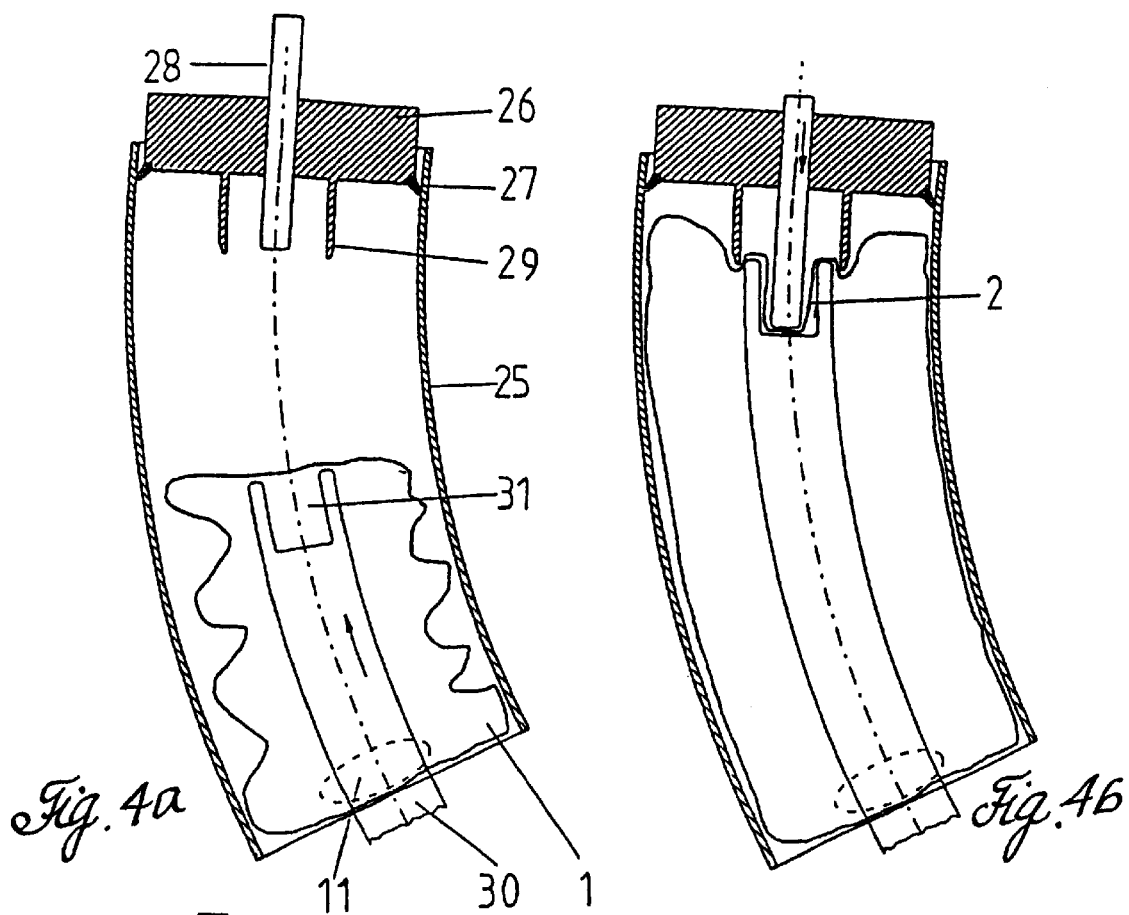
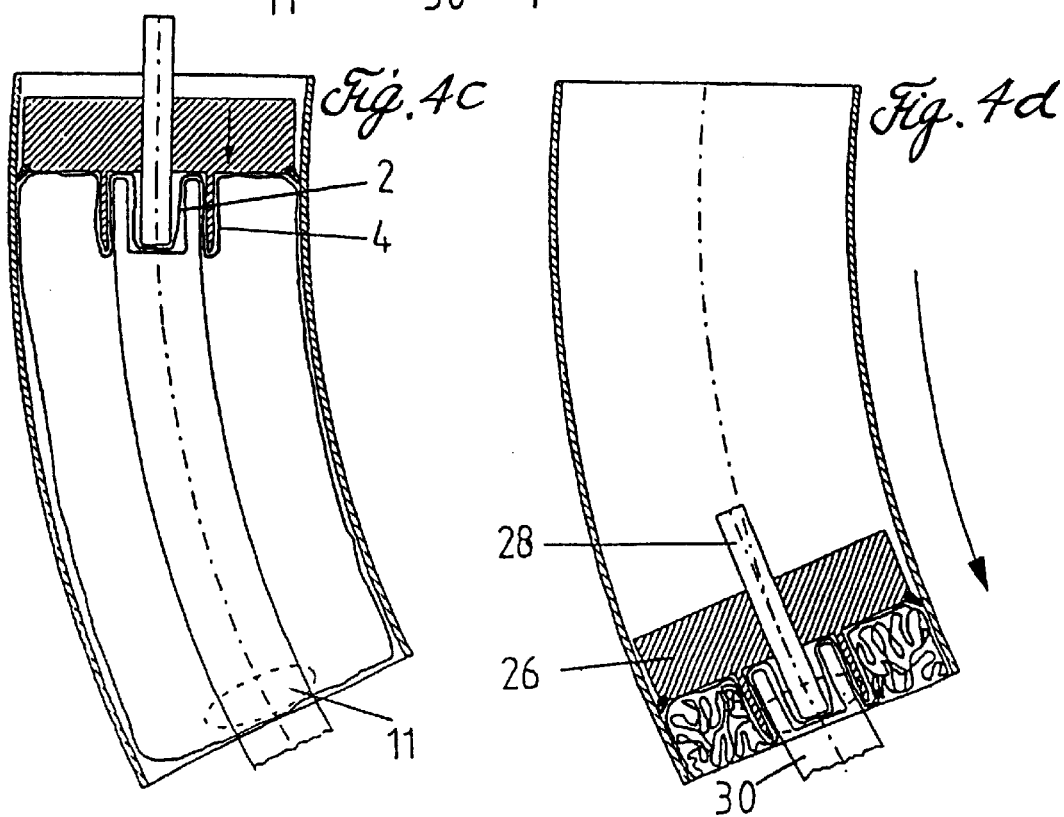

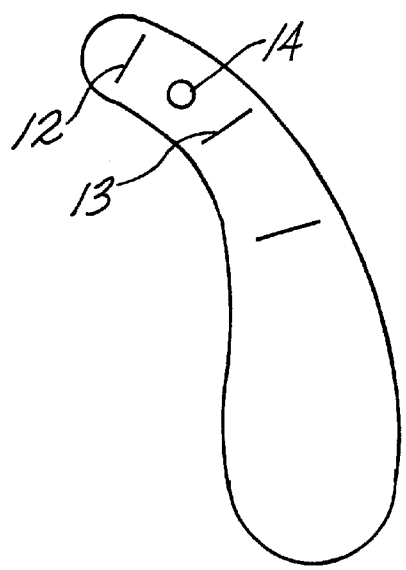
Fig. 5a
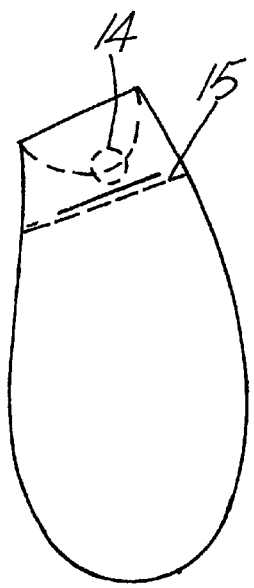
Fig. 5b
Fig. 5c
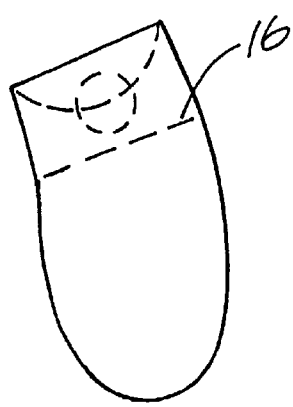

GAS BAG FOR AN AIRBAG MODULE, METHOD AND DEVICE FOR FOLDING A GAS BAG

BACKGROUND OF THE INVENTION

The present invention relates to a gas bag for an airbag module, as well as to a method and device for folding a gas bag.

The gas bag of an airbag module is folded in the rest position in the area of the gas generator and is covered from the passenger cell of the motor vehicle by means of a covering cap. The type of folding differs little irrespective of the position of the airbag, i.e. whether it is a driver, passenger or side airbag. Thus, in EP A 0 705 738 A1 a side airbag is described wherein the gas bag, as in the case of a driver airbag, is mounted at the side above the gas generator. A gas bag of a side airbag is also folded in a similar way, as is known from EP A 0 686 531 A. A gas bag folded in this way is extended during unfolding by the gas emerging from the gas generator. The outer folded edges are thereby moved to the side and forward until completely unfolded. Whereas with a driver airbag, as a rule, a free unfolding is guaranteed, in the case of a passenger and side airbag, unfolding can be impeded by external structural parts. These disadvantages particularly occur in the case of a side airbag which has to unfold substantially to the side and vertically and is thereby obstructed by parts of the door trim and by the seat. In the case of the side airbag there is the danger therefore that during unfolding it becomes hooked on obstructions and is deflected by these obstructions into an undesired direction. Apart from this faulty gas bag design and the faulty gas bag position, the unfolding time is also extended. The protection for the occupant is, therefore, incomplete and may even occur too late.

From specifications DE PS 195 16 494 C1, U.S. Pat. No. 5,496,061 and EP 0 523 704 A, it is known to fold the gas bag telescopically so that further telescopic folds extend around a telescopic fold stretching into the inside of the gas bag and run substantially across the unfolding direction.

SUMMARY OF THE INVENTION

The object of the invention is to fold the gas bag so that the risk of the gas bag being impeded by obstructions as it unfolds is at least considerably reduced.

A gas bag for an airbag module wherein the gas bag is folded telescopically in the rest position, in which further telescopic folds extend around a telescopic fold stretching into the inside of the gas bag and run substantially across the unfolding direction, has according to the invention, in addition to the telescopic folding, at least one section which is gathered and/or chaotically folded. With this type of folding the folds lie inside the gas bag and are protected from contacting obstructions located in the unfolding direction. The outermost fold is unfolded first. As unfolding continues, the remaining folds are released from outside inwards and are supported on any obstructions which may exist. The remaining fold parcel, which is to be unfolded, is moved in this way to the proposed position unimpeded.

In one embodiment it is proposed that the telescopic folds are enclosed at least in part by crumple folds.

Depending on the proposed unfolding direction and the existing obstructions it may be expedient that the telescopic folds have different depths and/or directions. The upper folded edges of the telescopic folds lie in one embodiment substantially in one plane. It can however be expedient if the upper folded edges of the telescopic folds lie in surfaces inclined towards each other or in one surface which is curved outwards or inwards in the direction of the folds. The sequence and speed at which the folded layers unfold can hereby be influenced.

The telescopic folds extend at least from one side of the gas bag into same.

When using a tubular gas bag such as is suitable for a side airbag the telescopic folds preferably extend around its longitudinal axis. The gas bag is with this type of folding severely shortened in length when in the folded state.

In a further embodiment of the invention it is proposed that an outflow opening is provided in at least one fold which can be closed.

Furthermore, at least one stitched or rip seam is provided for presetting the direction or defining individual gas bag areas inside one fold or between at least two folds.

With a method according to the invention for folding a gas bag it is proposed that the gas bag is placed telescopically in folds into the inner cavity of the gas bag step-wise, at least from one side, and that the gas bag is then compressed so that the remaining gas bag fabric which is not yet folded lies in folds about the telescopic folds.

In one embodiment of the method, the gas bag which is to be folded is biased with compressed air and then placed telescopically in folds, up to a predetermined depth, into the inner cavity of the gas bag. Subsequently or simultaneously the compressed air is let down. The first telescopic fold thereby formed is secured. The gas bag is then biased with compressed air again and is folded again telescopically into the inside of the gas bag in a ring round the first telescopic fold whereby the compressed air is let down simultaneously or subsequently. After securing the first and second telescopic fold the process described for the second telescopic fold is repeated until reaching the desired number of folds.

In a further development of the method, it is proposed that in successive steps of the telescopic folding, folds of different depth are provided and/or the telescopic folds are made in different directions.

With a tubular gas bag the telescopic folds are preferably made in the direction of the center line of the gas bag.

A device according to the invention for folding a gas bag is characterized in that a housing is provided wherein the gas bag can be fixed at one end of the housing inside, whereby a folding mandrel can be inserted from this end, while at the other end of the housing there is a packing ram, which can be moved into the housing, and a displaceable folding lance is mounted in the center of the ram whereby at least one folding element fixed on the packing ram extends round the lance and wherein the folding mandrel has a recess into which the folding lance can be inserted.

The cross section of the housing corresponds substantially to the cross section of the airbag module with folded airbag.

Furthermore it is expedient to provide at the edge of the packing ram a stripper element which adjoins the inner wall of the housing and ensures easy movement of the packing ram in the housing.

DESCRIPTION OF THE DRAWINGS

The invention will now be explained with reference to embodiments shown in the drawings in which:

FIGS. 4a–d show an embodiment of a folding tool in different work positions;

FIGS. 5a–c show a gas bag with rip seams in different folding stages.

DETAILED DESCRIPTION OF THE INVENTION

Figure 1:
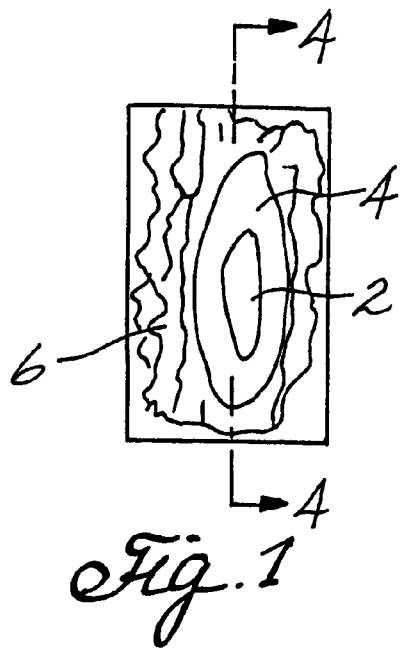
FIG. 1 is a plan view of a gas bag folded by means of telescopic folds.
Figure 2:
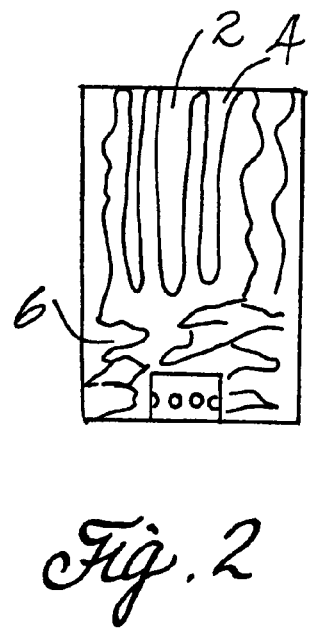
FIG. 2 shows a section through the gas bag according to FIG. 1 along the line IV—IV.

The gas bag according to FIGS. 1 and 2 has in addition to telescopic folds 2 and 4 crumple folds 6, i.e. chaotic folds. These extend around the telescopic folds 2 and 4 as well as between the telescopic folds and a gas generator 3.

Figure 3A:
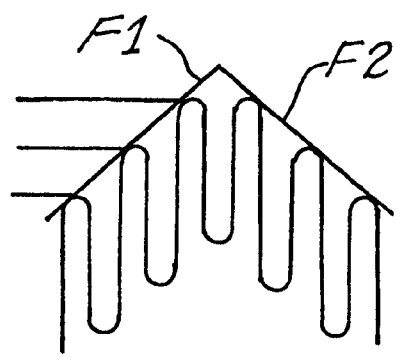
FIGS. 3a,b are longitudinal sections through two further embodiments of the gas bag without showing the crumple folds.
Figure 3B:
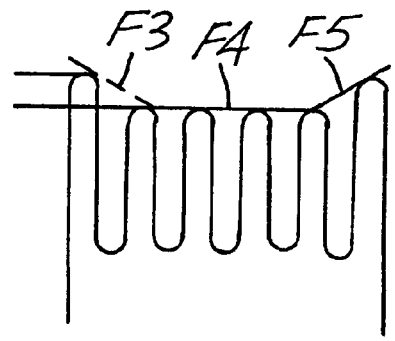

With the embodiment of FIG. 2 the upper folded edges of the telescopic folds 2 and 4 lie in one plane. With the embodiment of FIG. 3a the upper fold edges lie in two surfaces F1, F2 running inclined towards each other so that the middle folds project increasingly over the outer folds. With the embodiment of FIG. 3b the upper fold edges lie in three different surfaces F3, F4, and F5 whereby the outer surfaces F3 and F5 run inclined towards each other in the direction of the gas bag so that the outer folds project over the inner folds.

It can be seen from the drawings that the folds lie within the gas bag. During unfolding the gas bag parts located inside the gas bag are protected from contacting obstructions located in the unfolding direction. During unfolding the individual folds unroll from inside outwards and are supported on obstructions. The remaining fold packet to be unfolded is in this way brought into the proposed position unimpeded.

FIGS. 4a to 4d show a device for telescopic folding wherein a housing 25 is provided whose cross-section corresponds substantially to the cross section of the airbag module and which stretches in one direction, substantially coinciding with the main unfolding direction of the gas bag. In the present case, the device has a curved shape. A packing ram 26 is mounted displaceable in the housing 25. This has, on the edge, a stripper element 27 which seals an interspace between the packing ram 26 and housing 25, which is necessary for the displacement. A folding lance 28 is guided in the center of the packing ram 26 and is movable relative to the packing ram. A circumferential folding element 29 is provided between the folding lance 28 and the housing wall.

The packing ram 26 is moved out from one end of the housing 25 and into same. At the other end of the housing there is a central folding mandrel 30 which can be moved in the direction of the center line of the housing and has at one end, projecting into the housing, a recess 31, in which the folding lance 28 is insertable.

The cross-sections of the folding element 29, the folding lance 28, the folding mandrel 30 and the recess 31 correspond substantially to the contour of the telescopic folds which are to be achieved.

Folding takes place in that the gas bag 1 is pushed into the housing 25 and is fixed in the lower area on the housing. The folding mandrel 30 is then inserted into the gas bag through the inlet opening 11 (FIG. 4a) and then brought into its upper position whereby the gas bag 1 is stretched (FIG. 4b). The folding lance 28 is now moved into the recess 31 of the folding mandrel 30 and the first inner telescopic fold 2 is thereby formed. The inside of the gas bag 1 is then biased with compressed air and in a next step the packing ram 26 is moved in the direction of the folding mandrel 30 whereby the folding element 29 is pushed over same and thereby forms the second telescopic fold 4 (FIG. 4c).

The packing ram 26, the folding lance 28 and the folding mandrel 30 are then moved in the direction of the inlet opening 11 so that the gas bag is compressed (FIG. 4d). The remaining gas bag fabric which has not yet been folded is thereby placed in folds around the telescopic folds.

In FIG. 5a the gas bag has an outflow opening 14 between the first and the second telescopic folds 12 and 13. The gas bag is shown in the starting position in FIG. 5a. In FIG. 5b the gas bag has already been placed telescopically in folds twice. In order to prevent premature outlet of the gas from the outflow opening 14, the second folded layer is connected to the unfolded gas bag by a rip seam 15. FIG. 5c shows the gas bag after a further folding step. A rip seam 16 is provided there in the third folded layer.

What is claimed is:

1. A folded gas bag for an airbag module comprising:

a first telescopic fold, wherein the gas bag is folded telescopically;

a further telescopic fold extending around the first telescopic fold, the further telescopic fold extending into an inner cavity of the gas bag, the gasbag having an unfolding direction and the first telescopic fold and the further telescopic fold running substantially across the unfolding direction; and at least one airbag section having crumple folds.

2. A as bag according to claim 1 wherein the telescopic folds are enclosed at least in part by the crumple folds.

3. A gas bag according to claim 1 wherein the telescopic folds have different depths.

4. A gas bag according to claim 1 wherein the telescopic folds comprise a plurality of upper folded edges which lie in surfaces included towards each other.

5. A gas bag according to claim 1 wherein the telescopic folds comprise a plurality of upper folded edges which lie substantially in one plane.

6. A gas bag according to claim 1 wherein the telescopic folds extend into the gas bag at least from one side.

7. A gas bag according to claim 1 wherein the gas bag has a tubular shape and a center line and wherein the telescopic folds extend around the center line.

8. A gas bag according to claim 1 wherein at least one fold comprises an outflow opening.

9. A gas bag according to claim 8 wherein the outflow opening is closable.

10. A gas bag according to claim 1 wherein at least one rip seam is provided in one fold.

11. A gas bag according to claim 1, wherein the telescopic folds comprise a plurality of upper folded edges lie in a surface which is curved inwards in the direction of the folds.

12. A gas bag according to claim 1, wherein the telescopic folds comprise a plurality of upper folded edges lie in a surface which is curved outwards in the direction of the folds.

13. A gas bag according to claim 1 wherein at least one rip seam is provided in between at least two folds.

\* \* \* \* \*